United States Patent
Choi et al.

(10) Patent No.: US 8,474,030 B2
(45) Date of Patent: Jun. 25, 2013

(54) USER AUTHENTICATION SYSTEM USING IP ADDRESS AND METHOD THEREOF

(75) Inventors: Inhyuk Choi, Seongnam (KR);
Youngsik Jung, Yongin (KR); Minchol Song, Suwon (KR); Jongwon Paek, Suwon (KR); Haneul Lee, Seongnam (KR); Jungyun Son, Seongnam (KR); Hyoungjun Lee, Seongnam (KR); Sungho Lee, Seoul (KR); Sanghun Jeon, Seoul (KR)

(73) Assignee: NHN Business Platform Corporation, Seongnam-si (KR)

( * ) Notice: Subject to any disclaimer, the term of this patent is extended or adjusted under 35 U.S.C. 154(b) by 1118 days.

(21) Appl. No.: 12/195,010

(22) Filed: Aug. 20, 2008

(65) Prior Publication Data

US 2009/0055912 A1    Feb. 26, 2009

(30) Foreign Application Priority Data

Aug. 21, 2007 (KR) .................. 10-2007-0083881

(51) Int. Cl.
*H04L 29/06* (2006.01)
(52) U.S. Cl.
USPC .................................. 726/10; 726/6
(58) Field of Classification Search
None
See application file for complete search history.

(56) References Cited

U.S. PATENT DOCUMENTS

| | | | | |
|---|---|---|---|---|
| 8,069,117 | B1* | 11/2011 | Gay et al. | 705/54 |
| 2002/0087894 | A1* | 7/2002 | Foley et al. | 713/202 |
| 2005/0066043 | A1* | 3/2005 | Wallman | 709/229 |
| 2006/0028996 | A1* | 2/2006 | Huegen et al. | 370/252 |
| 2007/0044144 | A1* | 2/2007 | Knouse et al. | 726/8 |
| 2007/0136573 | A1* | 6/2007 | Steinberg | 713/155 |
| 2007/0150603 | A1* | 6/2007 | Crull et al. | 709/227 |
| 2007/0156761 | A1* | 7/2007 | Smith, III | 707/104.1 |

FOREIGN PATENT DOCUMENTS

| | | |
|---|---|---|
| JP | 2005-149239 | 6/2005 |
| KR | 1020010098423 | 11/2001 |
| KR | 10-2003-0016073 | 2/2003 |
| WO | WO 2007110951 A1 * | 10/2007 |

OTHER PUBLICATIONS

The First Office Action issued by the State Intellectual Property Office of P.R. China dated Sep. 6, 2010.

* cited by examiner

*Primary Examiner* — David Pearson
(74) *Attorney, Agent, or Firm* — H.C. Park & Associates, PLC (57) ABSTRACT

A method for authenticating a user by IP address check includes: receiving a URL and a session cookie from a client; determining whether or not an IP address of the client has been changed based on the session cookie; resetting the session cookie, if the IP address has been changed, by adding the changed IP address as a temporary IP address thereto; determining whether or not the URL is required to perform IP address check; requesting a re-login to the client if it is determined that the URL is required to perform IP address check; and adding the temporary IP address to a valid IP address list for the user if the re-login is successful.

17 Claims, 9 Drawing Sheets

USER AUTHENTICATION SYSTEM USING IP ADDRESS AND METHOD THEREOF

CROSS-REFERENCE TO RELATED APPLICATION

This application claims the benefit of Korean Patent Application No. 10-2007-0083881, filed on Aug. 21, 2007, the entire disclosure of which is incorporated herein by reference.

TECHNICAL FIELD

The present disclosure relates to a user authentication system through IP address check in response to the user's request for a web service and a method thereof.

BACKGROUND ART

Recently, various web services have been provided to users in online environment. Some web service providers require users to join the membership and pass user authentication to receive their services under members' authority.

For the web services to be provided the members in a safe manner, privacy and security should be guaranteed together with assignment of authority to the members. That is, if a user authentication process is completed, it is desirable that the members do not feel inconvenient in using the web services according to their authorities while a specific session is maintained, but as to a web service which requires user authentication, the members' security should be protected.

Figure 1:
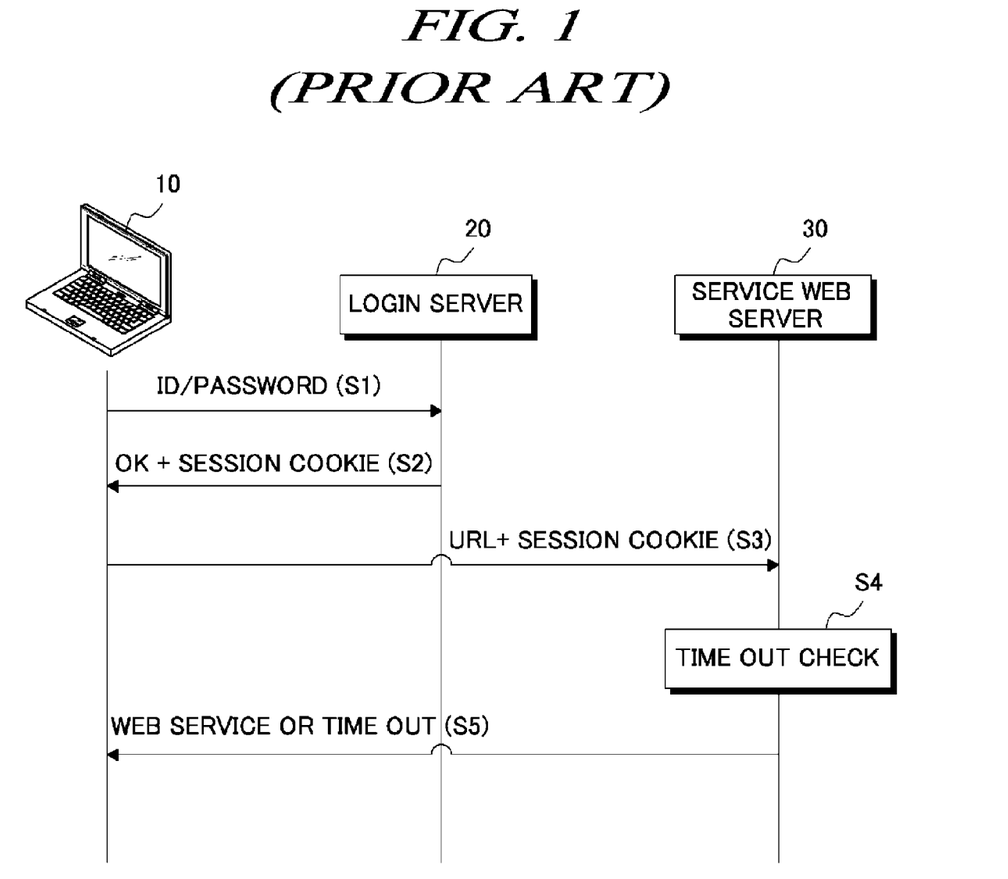
FIG. 1 is a schematic view showing a conventional user authentication system.

FIG. 1 provides a schematic view showing a conventional user authentication system. The conventional user authentication system includes a client 10, a login server 20 and a service web server 30. The conventional user authentication system maintains a user session by using a session cookie and provides a web service.

The client 10 inputs user's ID and a password into a login page of a web browser and transmits the ID and password to the login server 20 (S1).

The login server 20 for performing a user authentication allows login when the ID and password are identical with those which have already been registered in a user database (not illustrated) and transmits the session cookie for maintaining the session to the client (S2).

A cookie includes character string information which is transmitted to the web browser of a client by a web server and is sent back to the server upon a request of the server. The cookie may include data regarding who viewed what information of which web site.

The session cookie may include various kinds of personal information such as an ID, an e-mail address, a name, a birth date, sex, or the like.

When the client 10, after login, wants to use a web service corresponding to a specific URL of the service web server 30, the client 10 transmits the relevant URL and the session cookie (S3).

In response to transmission of the URL, the service web server 30 checks whether or not the session cookie is still valid (e.g., checking timeout) and then if still valid, the service web server 30 provides a web service corresponding to the URL, and if timeout is ascertained, a message of "access denied" or a message of "timeout" is notified. (S4, S5)

The conventional system, however, has a drawback in that the session cookie may be hijacked by an illegal user such as a hacker or the like. For example, the hacker may use a malicious program to steal a packet transmitted from the client PC, which is called 'sniffing.' Since the character string of the session cookie is encrypted, it is not easy to find an ID and a password even if the session cookie is hijacked. Nonetheless, once the session cookie is hijacked, it can be used by others to access a specific web service.

In a method that has been proposed to solve this Problem, only the session cookie transmitted from a predetermined IP address is used for user authentication. This method, however, is not suitable for the current and future ubiquitous environment and network portability. In particular, a significant number of users use a plurality of IP addresses, for example, when the location of the client is changed (e.g., from home or office to an internet cafe), when a wireless LAN using a dynamic IP assignment is used or when a private network with a NAT (Network Address Translation) device is used. Accordingly, the method has become an obstacle to a frequent use of web services.

There is thus a need for an advanced user authentication system and a method thereof.

The above information disclosed in this Background Art section is only for enhancement of understanding of the background of the invention and therefore it may contain information that does not form the prior art that is already known in this country to a person of ordinary skill in the art.

SUMMARY OF THE DISCLOSURE

One of the objects of the present disclosure is to provide a user authentication system and method that can keep web service security even if a session cookie is hijacked.

Another object is to provide a user authentication system and a method thereof that can optionally set IP address check function depending on a security level.

Still another object is to provide a user authentication system and a method thereof that can stably provide web services to a user even if the user's IP addresses are dynamically changed.

In accordance with an aspect of the present invention, there is provided a user authentication system using IP address check, including: a login server for allowing a user to login by a user ID and password; a log DB for storing access log records containing an IP address used by a client for login; a public pattern generating unit for generating a first valid IP address list of the user from IP addresses stored in the log DB; a public pattern DB for storing the first valid IP address list generated by the public pattern generating unit; and an IP address check authentication module for providing a web service corresponding to a URL requested from the client having an IP address belonging to the first valid IP address list by generating a session cookie containing the first valid IP address list.

In accordance with another aspect of the present invention, there is provided a method for authenticating a user by using IP address check, including: allowing the user to select whether or not a valid IP address list generated from access log records of the user is to be used for user authentication; generating a session cookie containing a user ID and the valid IP address list, if it is selected that the valid IP address list is to be used; and providing a web service by using the session cookie if a request for the web service is made by a client having an IP address that belongs to the valid IP address list.

In accordance with still another aspect of the present invention, there is provided a method for authenticating a user by IP address check, the method including: receiving a URL and a session cookie from a client; determining whether or not an IP address of the client has been changed based on the session cookie; resetting the session cookie, if the IP address has been changed, by adding the changed IP address as a temporary IP address thereto; determining whether or not the URL is required to perform IP address check; requesting a re-login to the client if it is determined that the URL is required to perform IP address check; and adding the temporary IP address to a valid IP address list for the user if the re-login is successful.

In accordance with a further aspect of the present invention, there is provided a computer-readable storage medium having a data structure stored therein, for performing user authentication by IP address check according to security level, the data structure including: a first valid IP address list of a first class, which records first three octet values of each of IP addresses determined to be a group of IP addresses having been used by a user from access log records of the user; a first valid IP address list of a second class, which records first four octet values of each of IP addresses determined to be a group of IP addresses having been used by a user from access log records of the user; a second valid IP address list of a first class, which records first three octet values of each of IP addresses determined to be a group of IP addresses having been used with a user ID which succeeds in re-login; and a second valid IP address list of a second class, which records first four octet values of each of IP addresses determined to be a group of IP addresses having been used with a user ID which succeeds in re-login.

According to the aspects of the invention, even if the session cookie is hijacked, only the user who has been authenticated can receive the web service by using the valid IP address list. Further, the valid IP address list can be adaptively updated according to the user's activities and access logs even if the IP addresses are changed dynamically, thereby increasing conveniences of the user and providing web services to the user in a safe mode. In addition, the user can select an IP address check option for each security level, thus being able to receive web services corresponding to the security level selected by the user. Furthermore, the user can select a URL or URLs subject to IP address check, which may help prevent a web service server from being overloaded.

BRIEF DESCRIPTION OF THE DRAWINGS

The disclosure may best be understood by reference to the following description taken in conjunction with the following figures.

DETAILED DESCRIPTION

Hereinafter, embodiments of the present invention will be described in detail with reference to the accompanying drawings so that the present invention may be readily implemented by those skilled in the art. However, it is to be noted that the present invention is not limited to the embodiments but can be realized in various other ways. In the drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operation and/or existence or addition of elements are not excluded in addition to the described components, steps, operation and/or elements.

Figure 2:
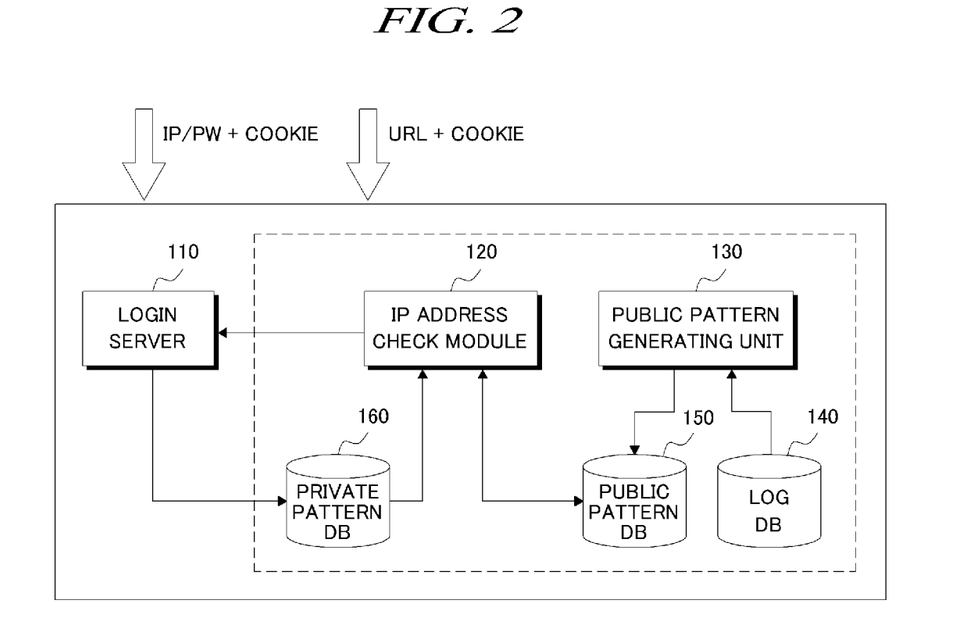
FIG. 2 is a block diagram showing a configuration of a user authentication system in accordance with an embodiment of the present invention.

FIG. 2 is a block diagram showing a configuration of a user authentication system in accordance with an embodiment of the present invention.

A user authentication system 100 includes a login server 110, an IP address check authentication module 120, a public pattern generating unit 130, a log DB 140, a public pattern DB 150 and a private pattern DB 160.

The login server 110 performs a user login process by receiving an ID and a password from the client. If the user login process is successful, the login server 10 issues a session cookie and provides web services available to the user by the user's authority. Meanwhile, in accordance with the embodiment of the present invention, the session cookie includes an IP address. The IP address is classified into a valid IP address and a temporary IP address based on its property. The valid IP address and the temporary IP address will be explained in detail later.

The IP address check authentication module 120 performs an IP address check on the session cookie transmitted from the client and resets the session cookie. More specifically, when the IP address of the client from which the session cookie has been transmitted is different from an IP address of the client which the user had used for login, the IP address check authentication module 120 sets the changed IP address as a temporary IP address and resets the session cookie. Further, the IP address check module 120 checks whether or not the changed IP address belongs to valid IP addresses which have already been registered (patterned). The IP address check is performed when a specific web service corresponding to one of predetermined URLs is requested. Further, it is possible for the IP address check authentication module 120 to perform the IP address check based on a security level selected or set by the user.

The log DB 140 stores access log records generated by access activities or logins/logout activities. The access log records are matched with the client's IP address or addresses corresponding to a specific user's ID and then stored.

The public pattern generating unit 130 generates an IP address pattern of the user based on IP address or addresses stored in the log DB 140. In a practical manner, in case of that IP addresses are changed dynamically in a private network using an NAT device, IP address change within a pair or a group of specific IP addresses can be treated as a valid change.

The IP address pattern of the user is stored in the public pattern DB 150 as a valid IP address list. An IP address change within the valid IP address list is treated as a valid change, so additional process (e.g., request for re-login) can be omitted.

The private pattern DB 160 generates and stores a valid IP address list based on the user's activities. For example, if the IP address check authentication module 120 requests the client to login again and, thus the re-login succeeds, a temporary IP address (an IP address changed after the login) is added to the valid IP address list and stored in the private pattern DB 160.

In other words, the public pattern DB 150 stores a valid IP address list generated based on the access log records related to all of the users while the private pattern DB 160 stores a valid IP address list generated based on the individual user's specific activities.

The public pattern DB 150 and the private pattern DB 160 can be implemented in a physically integrated device. The valid IP address list may, preferably, include either one of a first class represented by only first three octet values of IP addresses (e.g., 211.203.5) and a second class represented by all octet values of IP addresses (e.g., 211.203.5.33).

Hereinafter, the operation of each component of the user authentication system in accordance with an embodiment of the present invention will be explained in detail.

Figure 3:
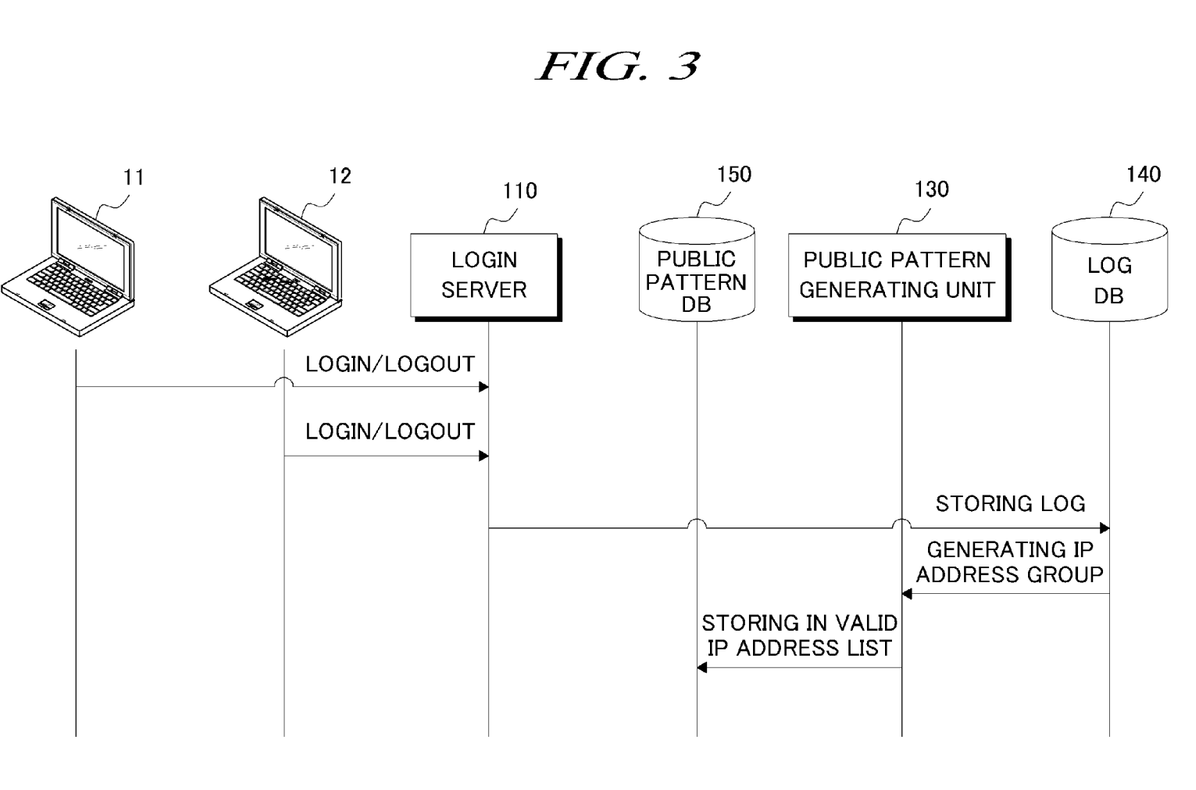
FIG. 3 illustrates a process of making a valid IP address list in the user authentication system in accordance with the embodiment of the present invention.

FIG. 3 illustrates a process of making a valid IP address list in the user authentication system in accordance with an embodiment of the present invention.

The login processes are carried out by the client 11 and the client 12 with the same user ID and each access log record is stored in the log DB 140. As mentioned above, the access log records contain the IP addresses at the login attempts. Here, it is assumed that the client 11 and the client 12 have different IP addresses.

The public pattern generating unit 130 generates the valid IP address list based on the access log records stored in the log DB 140. It is possible for the valid IP address list to contain, for example, the client's IP addresses used for the login activities of the same user or the IP addresses used by the same NAT device.

The valid IP address list is stored in the public pattern DB 150 and if the IP address check option is selected later, the IP address change within the list can be treated as a valid change.

With the foregoing configuration, even if the IP addresses are changed frequently, it is possible to find the pattern of the IP address changes and ensure the security for the user authentication without any additional process. Further, it is possible to update the valid IP address list by generating it periodically (e.g., 2 weeks, 1 month, six months, etc.).

Figure 4:
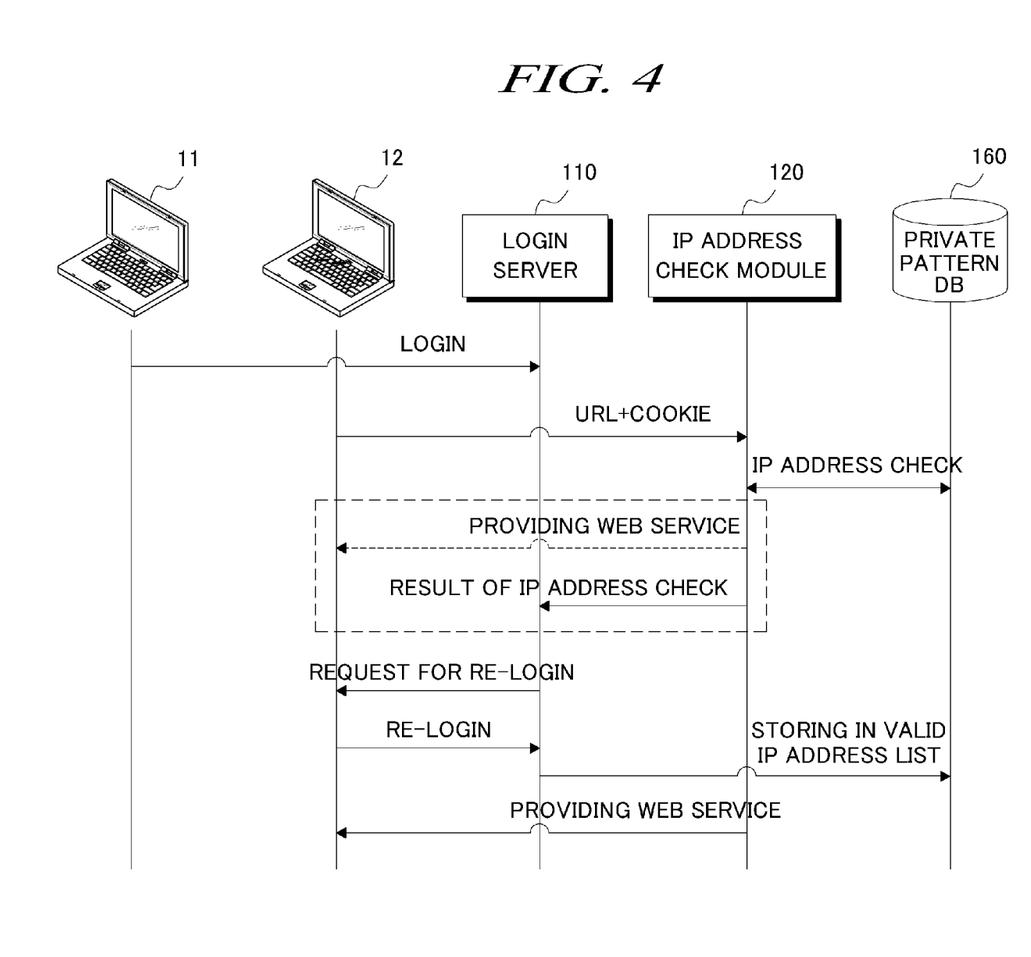
FIG. 4 illustrates a process of handling a temporary IP address in the user authentication system in accordance with the embodiment of the present invention.

FIG. 4 illustrates a process of handling a temporary IP address in the user authentication system in accordance with an embodiment of the present invention.

While a session is maintained after a login by the client 11 is allowed, a request for a web service corresponding to a specific URL can be sent from the client 12. Here, it is assumed that the client 11 and the client have different IP addresses.

When the IP address contained in the session cookie transmitted together with the URL from the client 12 is different from a current IP address of the client 12 or when the current IP address of the client 12 does not belong to the valid IP address list stored in the private pattern DB 160, the IP address check authentication module 120 sets the current IP address of the client 12 as a temporary IP address and adds it to the session cookie. Although FIG. 4 illustrates that the IP address check is performed by referring to only the valid IP address list stored in the private pattern DB 160, it is also possible to perform the IP address check by referring to the valid IP address list stored in the public pattern DB 150.

The IP address check authentication module 120 may perform the following two actions depending on the property of the transmitted URL.

If it is not necessary to perform the IP address check on the web service of the transmitted URL, an access and a use of the web service corresponding to the URL are allowed in order to provide an ordinary web service. Here, the session cookie which is reset by adding the temporary IP address thereto is also transmitted to the client 12.

On the other hand, if it is necessary to perform the IP address check on the web service of the transmitted URL, the result of the IP address check is transmitted to the login server 110. Examples of the URLs that need IP address check may include those which provide services such as reading and/or writing e-mails, messages, articles and/or secret writings.

If it is necessary to perform the IP address check, the login server 110 creates an additional login pop-up window and requests the client 12 to login again. If the re-login of the client 12 succeeds, the login server 110 stores the temporary IP address in the valid IP address list of the private pattern DB 160.

Then, since the current IP address of the client 12 belongs to the valid IP address list, the IP address check authentication module 120 allows the web service to be provided to the client 12.

Even though it is not illustrated, if the client 12 fails to login again, an access and a use of the requested web service are not allowed.

With configurations illustrated in FIGS. 3 and 4, the user authentication system in accordance with the embodiment of the present invention prevents the hijacked session cookie from being used by illegal users to access the web service and also provides a web service to a legal user adaptively even under the circumstance where the IP address is frequently changed.

Figure 5:
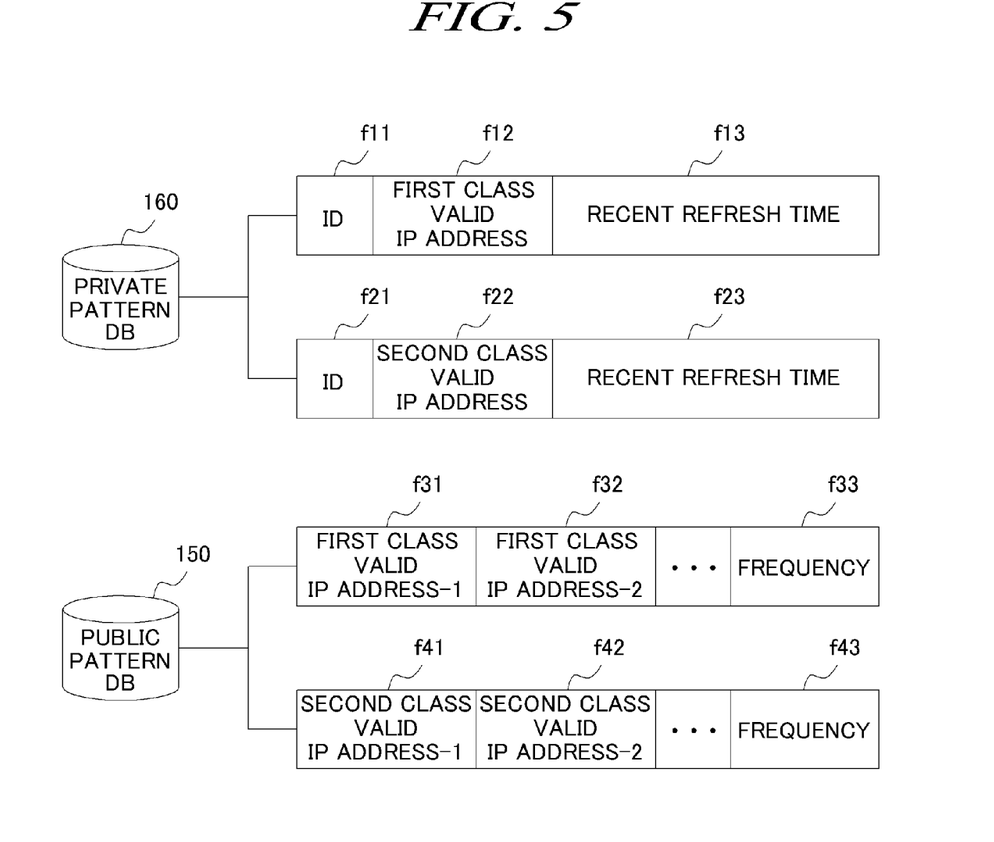
FIG. 5 illustrates data structures of a private pattern database (DB) and a public pattern DB in accordance with an embodiment of the present invention.

FIG. 5 illustrates data structures of a private pattern DB and a public pattern DB in accordance with an embodiment of the present invention.

If a login process for the IP address check succeeds, the private pattern DB 160 stores the temporary IP address as the valid IP address. The stored data structure includes a user ID f11, a first class valid IP address f12 and a recent refresh time f13. Further, the data structure includes a user ID f21, a second class valid IP address f22, a recent refresh time f23.

The data of IP address f12, f22 can include a plurality of IP addresses. The IP address of the first class valid f12 is represented by only the first three octet values among four octet values of the IP address. Accordingly, the check is performed only on the first three octet values and if the first three octet values are the same as those of the valid IP address, it is treated as a valid IP address. Meanwhile, the valid IP address of the second class f22 is represented by all the four octet values. Accordingly, the check is performed on the four octet values and if all of these four octets are the same as those of the valid IP address, it is treated as a valid IP address. In other words, the data structure for checking the IP address of the second class has a higher security level than the data structure for checking the valid IP address of the first class.

The recent refresh time f23 refers to a time when the valid IP address is most recently refreshed. Based on the refresh time, it is possible to restrict a time interval during which the temporary IP address is added to the valid IP address list.

The public pattern DB 150 correlates a pair or a group of IP addresses based on the log records regarding the access to the web server and stores the valid IP address list. Generally, the valid IP address list belongs to the IP address list of the same NAT device.

The stored data structure illustrated in FIG. 5 includes first class valid IP addresses f31, f32 and a frequency f33. Further, the stored data structure includes second class valid IP addresses f41, f42 and a frequency f43.

The data f31, f32 may be a pair of the valid IP addresses and each of them stores the first three octet values of the IP address. The data f41, f42 may be a pair of the valid IP addresses and each of them stores four octet values of the IP address. As mentioned above, two data structures are substantially the same but the data structure which uses the valid IP address list of the second class offers a higher security level.

Each of the frequencies f33, f43 means a frequency of occurrence of the pair of the IP addresses possible to be included in the valid IP address list. The exact values of the frequencies can be set by an administrator.

Figure 6:
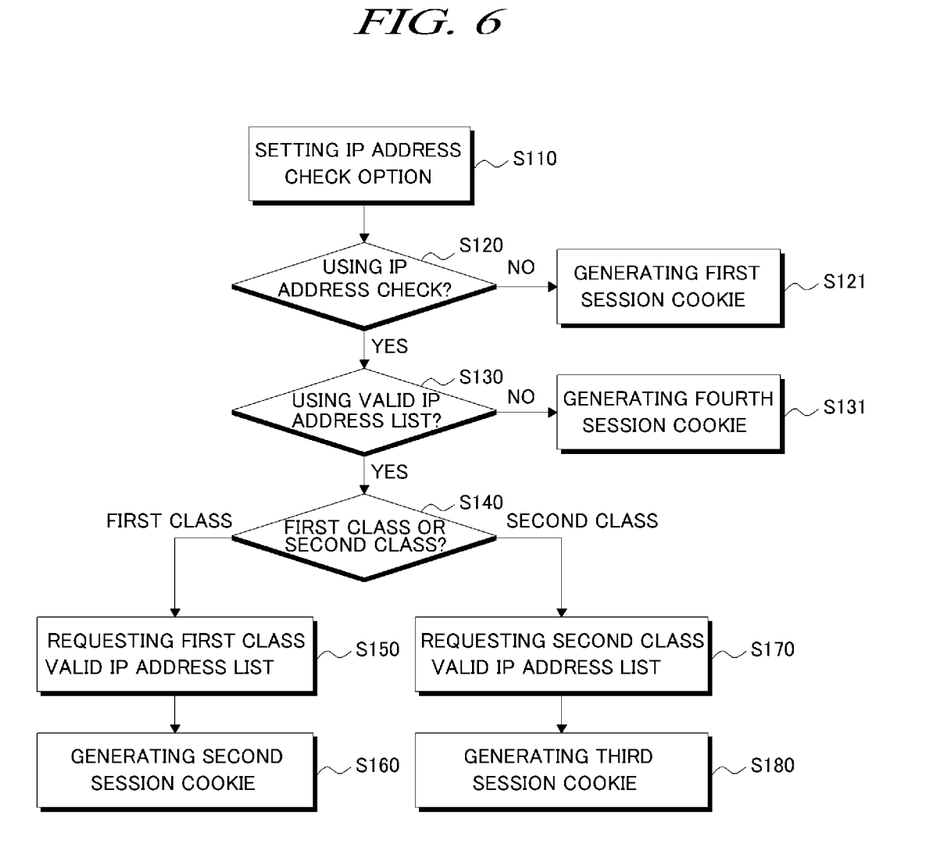
FIG. 6 is a flow chart showing a user authentication method in accordance with an embodiment of the present invention.

FIG. 6 is a flow chart showing a user authentication method in accordance with an embodiment of the present invention.

In Step S110, the user authentication system sets an IP address check option. The IP address check option can be set in response to the client's selection. It is desirable that the user may set the IP address check option and performs a login at the same time by selecting the options in the login window.

In this embodiment, the IP address check option may include the options of (1) skipping IP address check, (2) using valid IP address list of first class, (3) using valid IP address list of second class and (4) using only a single IP address, in order of security level. The user can select one of the IP address check options according to the user's needs for security level.

In Step S120, it is determined whether or not the IP address check is used. If determined that the IP address check is not used, a first session cookie containing an identifier of the IP address check option and the user's login ID is generated (S121).

If it is determined that the IP address check is used, it is further determined whether or not the valid IP address list is used (S130). If it is determined that the valid IP address list is not used, a fourth session cookie containing a result of comparing the current IP address with the predetermined single IP address is generated (S131). Here, the valid IP address list contains the IP address group of the same user and the group is generated based on the access log records. Further, the valid IP address list includes the changed IP address in case that a re-login is requested due to the change of the IP address, and if the re-login succeeds.

If it is set to use the valid IP address list, it is determined which valid IP address list of the first class or the second class is to be selected (S140).

If the first class is selected, the valid IP address list of the first class is requested (S150) and a second session cookie containing the valid IP address of the first class is generated (S160).

If the second class is selected, the valid IP address list of the second class is requested (S170) and a third session cookie containing the valid IP address of the second class is generated (S180).

In the embodiment, the session cookie may include the information as follows.

The first session cookie=[session IP check option], [user ID]

The second session cookie=[session IP check option], [valid IP address or addresses of the first class], [temporary IP address of the first class], [user ID]

The third session cookie=[session IP check option], [valid IP address or addresses of the second class], [temporary IP address of the second class], [user ID]

The fourth session cookie=[session IP check option], [user ID]

As mentioned above, since the session cookie is generated according to each IP address check option, it is possible to provide various user authentication functions depending on the IP address check option selected by the user.

Figure 7:
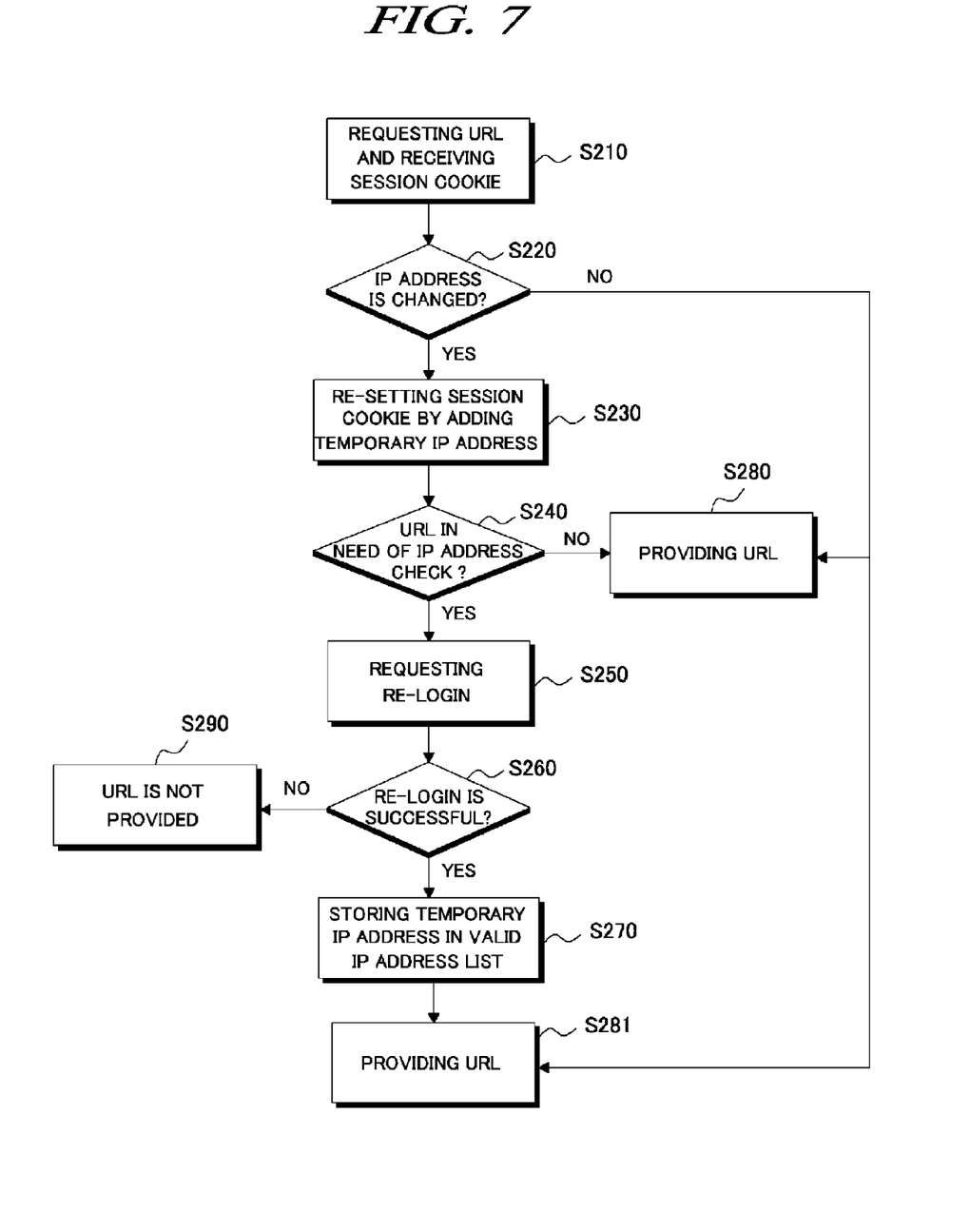
FIG. 7 is a flow chart showing a method of authenticating a user and updating a valid IP address list in accordance with an embodiment of the present invention.

FIG. 7 is a flow chart showing a method of performing the user authentication and updating the valid IP address list in accordance with an embodiment of the present invention.

The embodiment shown in FIG. 7 relates to a method for updating the valid IP address list in case of using a valid IP address list. Therefore, the session cookie mentioned in the embodiment related to FIG. 7 can be the second session cookie or the third session cookie shown in FIG. 6.

The user authentication system receives the session cookie and the URL corresponding to the web service requested by the client (S210). As mentioned above, the session cookie includes the valid IP address or addresses.

In Step S220, it is determined whether or not the IP address is changed. The determination is made by identifying if the current IP address of the client transmitting the URL is different from the valid IP address recorded at the first login. The identification can be made, for example, by comparing their first three octet values.

If it is determined that no change of the IP address occurs, the web service corresponding to the URL is provided (S280, S281).

Meanwhile, if it is determined that a change of the IP address occurs, the session cookie is reset by adding the changed IP address to the session cookie as a temporary IP address (S230).

In Step S240, it is determined whether or not it is necessary to perform the IP address check on the URL of the requested web service. Preferably, URLs that needs IP address check may be preset. Examples of such URLs include those which provide various web services such as reading and/or writing e-mails, messages, articles and/or secret writings.

If it is determined that it is not necessary to perform the IP address check, the web service can be provided without limitations (S280). However, the temporary IP address is added to the session cookie and if the URL of the web service in need of the IP address check is transmitted later by using the same session cookie, it is necessary to perform Step S240.

Meanwhile, if it is determined that it is necessary to perform the IP address check, a re-login is requested (S250). That is, after the login, the client's IP address is changed and the client's new IP address is a temporary IP address which is allowed to access to a restricted web service of the URL. In order to add the temporary IP address to the valid IP address list, it is necessary to perform a re-login. In order to request the re-login, it is desirable to provide an additional login pop-up window.

In Step S260, it is determined whether or not the re-login succeeds. If the re-login fails, the request for the web service is rejected (S290).

If the re-login succeeds, the temporary IP address is added to the valid IP address list (S270). Thereafter, if the user attempts a login by using the added temporary IP address later, the session of the user is to be treated as valid.

After the re-login succeeds, the web service corresponding to the URL sent by the user is provided (S281)

Here, the user authentication system may optionally provide the IP address check depending on a URL classified by using syntax as illustrated below.

IP address check URL: IPCheck_URL url1, url2, url3 . . .
IP address check return URL: IPCheck_ReturnURL url
IP address check test URL: IPCheck_TestURL url Here, the IP address check URL is a URL in need of the IP address check when the IP address check is set. The IP address check return URL is a URL to be redirected when it fails to pass the IP address check. The IP address check test URL is a URL for testing the IP address check. The IP address check test URL transmits a result of the IP address check with respect to the IP address check URL to the client.

Figure 8:
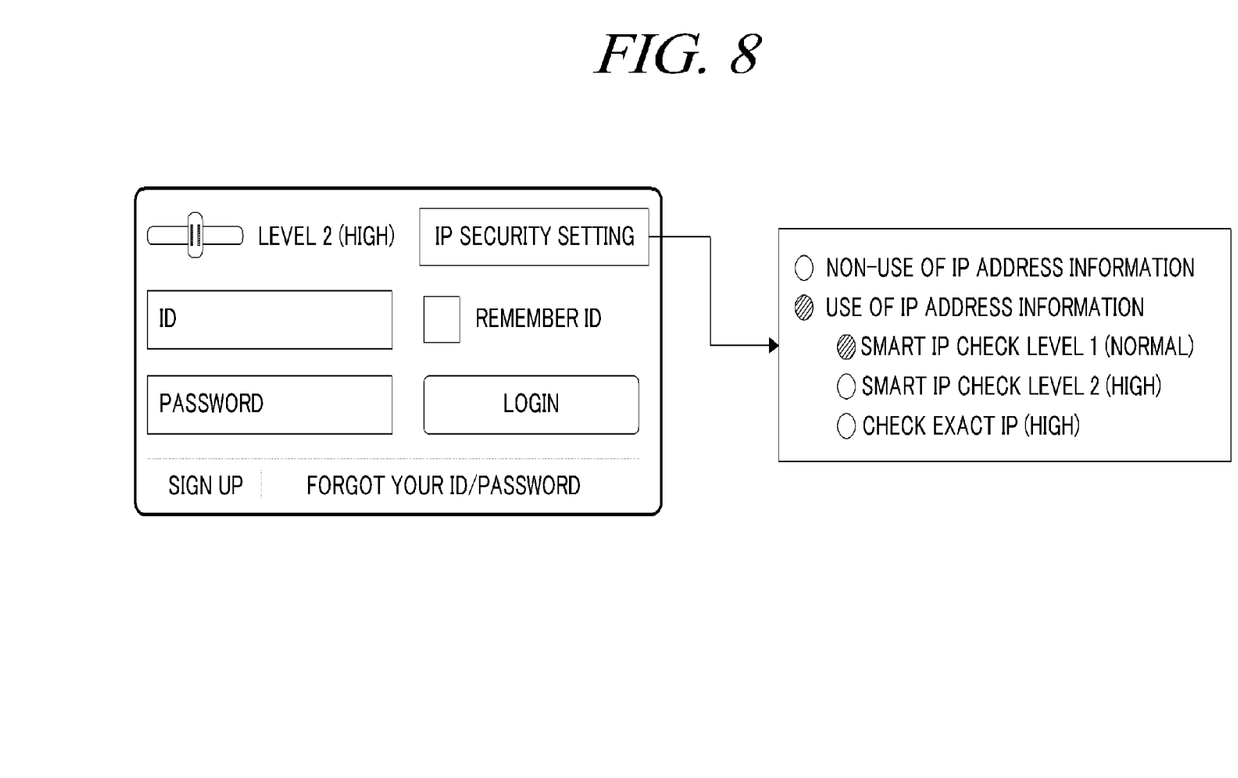
FIG. 8 illustrates a login window displaying an IP address check option in accordance with an embodiment of the present invention.

FIG. 8 illustrates a login window including the IP address check options in accordance with an embodiment of the present invention.

A login window in accordance with the embodiment of the present invention has an "IP Security Setting" button therein. It is possible for the user to select one of available options by using the IP Security Setting button.

As mentioned above, the IP Security Settings are divided into two cases: one of using the IP address information, the other of non-using the IP address information.

When the IP address information is not used, the conventional login is performed as a user authentication. The security level, in this case, is the lowest in the embodiments of the present invention.

When the IP address information is used, there are provided the plural options according to the security level.

For example, "Smart IP Check Level 1" uses the above-mentioned valid IP address list and compares the first class (the first three octet values). "Smart IP Check Level 2" uses the valid IP address list and compares the second class (four octet values). "Exact IP Comparison" does not use the valid IP address list but allows only a single IP address for a login.

The web services thus can be provided in a safe mode to users by allowing the users to select any security level in the IP address check options of the login window to prevent the user's cookie from being hijacked.

The detailed example of the IP address check options is listed in Table 1 as follows.

TABLE 1

| IP Check Option | | Explanation of Option | Recommended PC environment |
|---|---|---|---|
| Non-use of IP Check | | Non-use of IP address information in a session cookie | Notebook computer of a salesman or the like who frequently moves to another physical location |
| Use of IP Check | Smart IP Check Level 1 (Normal): Use of first class | If the same NAT IP address list and a concurrently usable IP address list contain a login IP address, the IP address lists are used as valid IP address lists of a session cookie. If a first class valid IP address list stored in a session | Home PC and Notebook computer subscribed to VDSL, Optical LAN or the like Office PC using a NAT device Business notebook computer using a dynamic IP assignment in a Wireless LAN |

TABLE 1-continued

| IP Check Option | Explanation of Option | Recommended PC environment |
|---|---|---|
| | cookie does not contain a first class of an IP address requesting a web service, a re-login is requested. | |
| Smart IP Check Level 2 (High): Use of second class | If the same NAT IP address list and a concurrently usable IP address list contain a login IP address, the IP address lists are used as valid IP address lists of a session cookie. If a valid IP address list stored in a session cookie does not contain an IP address who requesting a web service, a re-login is requested. | Business PC in an office having a few certified IP of a NAT device Home LAN environment in which a packet sniffing or the like is possible |
| Comparison of Exact IP (Highest) | Only single IP information is stored in a login session cookie. If an IP address stored in a session cookie is different from an IP address requesting a web service, a re-login is requested. | PC and Notebook computer using only fixed certified IP |

Figure 9:
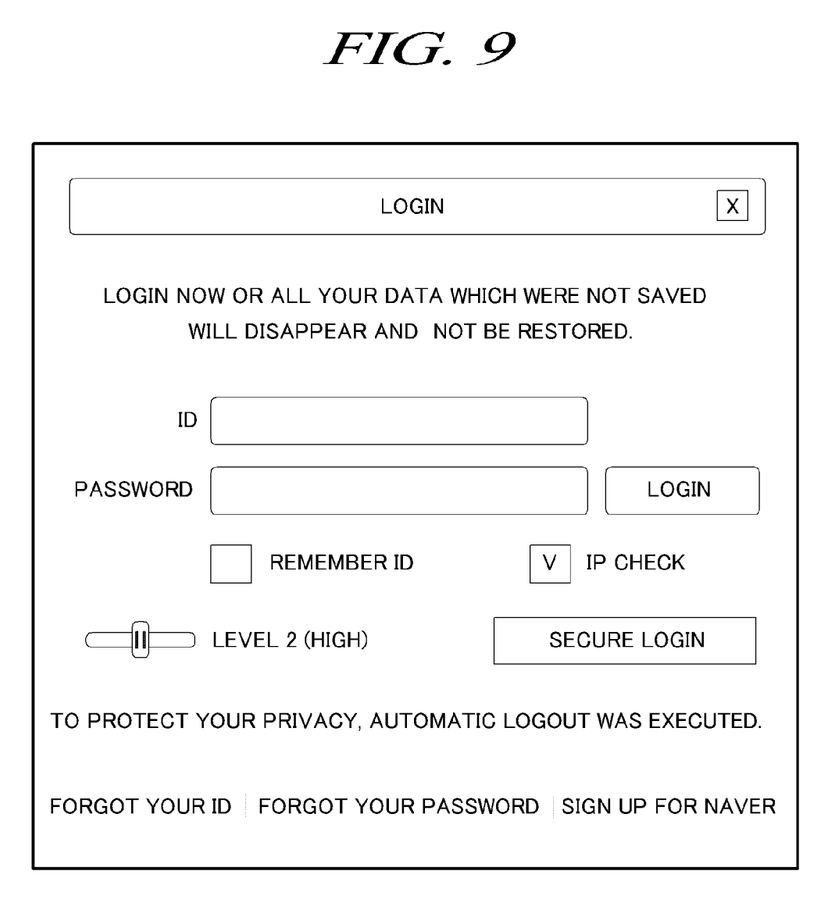
FIG. 9 illustrates a re-login window in accordance with an embodiment of the present invention.

FIG. 9 illustrates a re-login window in accordance with an embodiment of the present invention.

As mentioned above, if there is a request for the web service in need of the IP address check and the temporary IP address is different from the valid IP address, the login window is provided as illustrated in FIG. 9 and only if the login succeeds, it is possible to use and access to the web service.

The re-login window has an input box for inputting the user ID and password and a check box for checking whether or not the user wants to continue using the IP address check. For example, after the user de-selects "IP address check" in the window and the login succeeds, even if the user's IP address is changed, the re-login window illustrated in FIG. 9 does not appear. By this way, if the user expects that IP address of the client changed continuously, it is possible for the user to skip the IP address check options in order to avoid any inconvenience caused by repeated logins.

While various functional components have been described in the embodiments of the present disclosure, it should be appreciated the embodiments can be implemented in hardware, software, firmware, middleware or a combination thereof and utilized in systems, subsystems, components, or sub-components thereof. When implemented in software, the elements of the embodiments are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a processor, a computer, etc.).

The above-described systems, methods and storage medium protects users from cookie hijacking and also adaptively deals with users' IP address change which usually occur. Further, they provide secured user authentication by allowing users to set various security levels according to their needs. In addition, by allowing users to perform IP address check on selected URL or URLs, they prevent overload that can be caused by IP address check.

The above description of the present invention is provided for the purpose of illustration, and it would be understood by those skilled in the art that various changes and modifications may be made without changing technical conception and essential features of the present invention. Thus, it is clear that the above-described embodiments are illustrative in all aspects and do not limit the present invention.

The scope of the present invention is defined by the following claims rather than by the detailed description of the embodiment. It shall be understood that all modifications and embodiments conceived from the meaning and scope of the claims and their equivalents are included in the scope of the present invention.

What is claimed is:

1. A user authentication system, the system comprising:
   a login server configured to control login by using a user identification (ID) and a password;
   a log database (DB) configured to store log records of users, the log records comprising an IP address used for login; and
   an IP address check authentication module configured to receive a cookie and a Uniform Resource Locator (URL) and to determine whether or not an IP address of the respective users having been changed, wherein the cookie is reset by adding the changed IP address to the cookie as a temporary IP address, and the IP address check authentication module is configured to provide a login window to perform the re-login process upon detection of the IP address being changed and the URL being required for an authentication, wherein the temporary IP address is added into a valid IP address list upon detection of a successful re-login process, and wherein
   a web service corresponding to a requested URL is provided.

2. The user authentication system of claim 1, wherein the IP address check authentication module is configured to provide a web service corresponding to a URL requested from the user having an IP address in the valid IP address list.

3. The user authentication system of claim 1, wherein the URL being required for an authentication comprises one of URLs of web services comprising reading and writing e-mails, messages, articles, secret writings or any combination thereof.

4. The user authentication system of claim 1, wherein each IP address of the valid IP address list is expressed as one of a first class represented by first three octet values of the IP address or a second class represented by four octet values.

5. The user authentication system of claim 4, wherein the first class or the second class is selected by the user by providing a user interface comprising an IP address check option in response to detection of the successful re-login process.

6. The user authentication system of claim 4, wherein the cookie comprises a value of an IP address check option, the user ID and the valid IP address list corresponding to each of the first class and the second class.

7. The user authentication system of claim 1, further comprising:
   a user interface is provided, wherein either one of use of IP address or non-use of IP address associated with setting a security is selected, wherein the use of IP address comprises use of single IP address and use of valid IP address list according to a security level.

8. A computer-implemented method for authenticating a user, the method comprising:
   receiving a cookie and a URL;
   determining whether or not an IP address of a user having been changed, if changed the cookie being reset by adding the changed IP address to the cookie as a temporary IP address;
   providing a user with a user interface for a re-login process upon detection of the IP address being changed and the URL being required for an authentication, wherein the temporary IP address is added to a valid IP address list in response to detection of a successful re-login process; and
   providing a web service.

9. The method of claim 8, further comprising:
   providing a first class represented by first three octet values of the IP address in the valid IP address list and a second class represented by four octet values thereof; and
   adding information to the cookie data for specifying the use of the first class or the second class.

10. The method of claim 9, further comprising:
    providing an option to set an IP address checking, wherein the option comprises one of using valid IP address list of the first class, using valid IP address list of the second class, using only a single IP address, or any combination thereof according to a security level.

11. A method for authenticating a user by IP address check, the method comprising:
    receiving a URL and a session cookie from a client;
    determining whether or not an IP address of the client has been changed based on the session cookie;
    resetting the session cookie, upon detection of the IP address being changed, by adding the changed IP address as a temporary IP address thereto;
    determining whether or not the URL is required to be checking comprising whether the IP address of the client being changed and the URL being required for an authentication;
    requesting a re-login to the client in response to the determination of the URL being required an authentication and the IP address being changed; and
    adding the temporary IP address to a valid IP address list in response to detection of the re-login being successful.

12. The method of claim 11, wherein the session cookie comprises the valid IP address list.

13. The method of claim 12, wherein the valid IP address list comprises a group of IP addresses from log records of the client.

14. The method of claim 13, wherein the valid IP address list comprises first three octet values.

15. The method of claim 13, further comprising:
    providing a client interface to perform the re-login, wherein the converted temporary IP address is stored in a non-transitory storage medium as a valid IP address upon detection of the successful re-login.

16. A non-transitory computer-readable storage medium comprising an executable program, which when executed, for performing steps for user authentication according to a security level, the steps comprising:
- determining a first valid IP address list of a first class, which records first three octet values of each of IP addresses to generate a group of the IP addresses used by a first user from access log records associated with accessing information activities or login/logout activities of the first user;
- determining a first valid IP address list of a second class, which records first four octet values of each of IP addresses to generate a group of the IP addresses used by a second user from access log records of the second user;
- determining a second valid IP address list of a first class, which records first three octet values of each of IP addresses to generate a group of the IP addresses used by a second user, the second valid IP address comprising a temporary IP address which is added into the first valid IP address list of the first class in response to detection of a successful re-login process; and
- determining a second valid IP address list of a second class, which records first four octet values of each of IP addresses to generate a group of IP addresses the second valid IP address comprising a temporary IP address which is added into the first valid IP address list of the second class in response to detection of a successful re-login process.

17. The computer-readable storage medium of claim 16, wherein the first valid IP address list of the first class and the second valid IP address list of the first class are used for a lower security level than the first valid IP address list of the second class and the second valid IP address list of the second class.

* * * * *